United States Patent
Miyake

(10) Patent No.: US 10,042,620 B1
(45) Date of Patent: Aug. 7, 2018

(54) APPROACHES FOR AMALGAMATING DISPARATE SOFTWARE TOOLS

(71) Applicant: Palantir Technologies Inc., Palo Alto, CA (US)

(72) Inventor: Nicholas Miyake, Redwood City, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/343,096

(22) Filed: Nov. 3, 2016

(51) Int. Cl.
- G06F 9/44 (2018.01)
- G06F 9/445 (2018.01)
- G06F 8/36 (2018.01)
- G06F 8/54 (2018.01)

(52) U.S. Cl.
CPC . *G06F 8/36* (2013.01); *G06F 8/54* (2013.01)

(58) Field of Classification Search
None
See application file for complete search history.

(56) References Cited

U.S. PATENT DOCUMENTS

| | | | |
|---|---|---|---|
| 6,058,373 | A | 5/2000 | Blinn et al. |
| 7,685,109 | B1 | 3/2010 | Ransil et al. |
| 8,285,860 | B2 | 10/2012 | McGuire et al. |
| 8,819,106 | B1 | 8/2014 | Sirota et al. |
| 8,850,528 | B2 | 9/2014 | Van Biljon et al. |
| 9,256,657 | B1 | 2/2016 | Evenson et al. |
| 9,521,194 | B1 | 12/2016 | Gabrielson |
| 2004/0044727 | A1 | 3/2004 | Abdelaziz et al. |
| 2005/0228711 | A1 | 10/2005 | Lahey et al. |
| 2006/0048140 | A1 * | 3/2006 | Boctor ............ G06F 8/61 717/175 |
| 2006/0143521 | A1 * | 6/2006 | Lang ............. G06F 8/70 714/26 |
| 2007/0005801 | A1 | 1/2007 | Kumar et al. |
| 2007/0105597 | A1 | 5/2007 | Hwang |
| 2007/0168336 | A1 | 7/2007 | Ransil et al. |
| 2007/0180439 | A1 * | 8/2007 | Sundararajan ...... G06F 11/3644 717/158 |
| 2008/0127171 | A1 * | 5/2008 | Tarassov ............ G06F 8/60 717/174 |
| 2008/0209413 | A1 * | 8/2008 | Kakumani ........... G06F 8/67 717/172 |

(Continued)

OTHER PUBLICATIONS

Palantir, "Godel: A Build System for the Go Programming Language," published Nov. 1, 2016, https://medium.com/@palantir/godel-a-build-system-for-the-go-programming-language-9f7d2a4974e8.

*Primary Examiner* — Daxin Wu
(74) *Attorney, Agent, or Firm* — Sheppard Mullin Richter & Hampton LLP

(57) ABSTRACT

Systems and methods are provided for obtaining one or more source code files that correspond to a software program. At least one first software package that is separately executable from the software program is obtained, the first software package including one or more source code files. At least one first callable library for the first software package and at least one first invocation mechanism for calling the first callable library are generated. A composite software program that is capable of invoking at least the software program and the first callable library for the first software package using the first invocation mechanism is generated.

19 Claims, 6 Drawing Sheets

(56) References Cited

U.S. PATENT DOCUMENTS

| | | |
|---|---|---|
| 2009/0070757 A1* | 3/2009 | Bak .......................... G06F 8/60 |
| | | 717/177 |
| 2009/0132317 A1 | 5/2009 | Dholakia et al. |
| 2009/0132710 A1 | 5/2009 | Pelley |
| 2010/0057515 A1 | 3/2010 | Gandini et al. |
| 2010/0186020 A1 | 6/2010 | Maddhirala et al. |
| 2010/0235525 A1 | 9/2010 | McGuire et al. |
| 2011/0131448 A1 | 6/2011 | Vasil et al. |
| 2012/0180068 A1 | 7/2012 | Wein et al. |
| 2014/0310328 A1 | 10/2014 | Charif et al. |
| 2014/0310720 A1 | 10/2014 | Song et al. |
| 2014/0379777 A1 | 12/2014 | Yamamoto et al. |
| 2015/0172412 A1 | 6/2015 | Escriva et al. |
| 2016/0062777 A1* | 3/2016 | Duffield .............. G06F 9/44536 |
| | | 719/320 |
| 2017/0285981 A1 | 10/2017 | DeArment et al. |
| 2017/0285982 A1 | 10/2017 | DeArment et al. |

\* cited by examiner

APPROACHES FOR AMALGAMATING DISPARATE SOFTWARE TOOLS

FIELD OF THE INVENTION

This disclosure relates to approaches for developing software tools.

BACKGROUND

Under conventional approaches, software developers may rely on various software packages, e.g., development tools, to test and/or validate their software. These existing development tools may be utilized, for example, to format, check, test, build, distribute, and/or publish source code. In some instances, each software package may be a separate stand-alone executable. Depending on the development environment, having to separately obtain, compile and execute such packages can be cumbersome and inefficient.

SUMMARY

Various embodiments of the present disclosure can include systems, methods, and non-transitory computer readable media configured to obtain one or more source code files that correspond to a software program. At least one first software package that is separately executable from the software program is obtained, the first software package including one or more source code files. At least one first callable library for the first software package and at least one first invocation mechanism for calling the first callable library are generated. A composite software program that is capable of invoking at least the software program and the first callable library for the first software package using the first invocation mechanism is generated.

In some embodiments, the systems, methods, and non-transitory computer readable media are configured to cause the composite software program to invoke the first callable library for the first software package.

In some embodiments, the systems, methods, and non-transitory computer readable media are configured to execute the composite software program using a command-line argument that references the first invocation mechanism for the first software package.

In some embodiments, the first callable library is executed in a separate sub-process with a separate execution stack.

In some embodiments, the systems, methods, and non-transitory computer readable media are configured to obtain at least one second software package that is separately executable from the software program, the second software package including one or more source code files; generate at least one second callable library for the second software package and at least one second invocation mechanism for calling the second callable library; and generate a new composite software program that is capable of invoking at least the software program, the first callable library for the first software package using the first invocation mechanism, and the second callable library for the second software package using the second invocation mechanism.

In some embodiments, the new composite software program is capable of invoking functionalities of the software program, the first software package, and the second software package.

In some embodiments, the systems, methods, and non-transitory computer readable media are configured to determine that the first software package and the second software package both import a package that utilizes shared state such as global variables; create a first copy of the package for the first software package; modify the source code files for the first software package to use the first copy of the package; create a second copy of the package for the second software package; and modify the source code files for the second software package to use the second copy of the package.

In some embodiments, the systems, methods, and non-transitory computer readable media are configured to automatically rewrite the source code files corresponding to the first software package to be the first callable library.

In some embodiments, at least the source code file that includes a main function for the first software package is rewritten to be callable as a separate non-main library function.

In some embodiments, the systems, methods, and non-transitory computer readable media are configured to embed the first invocation mechanism in the composite software program.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
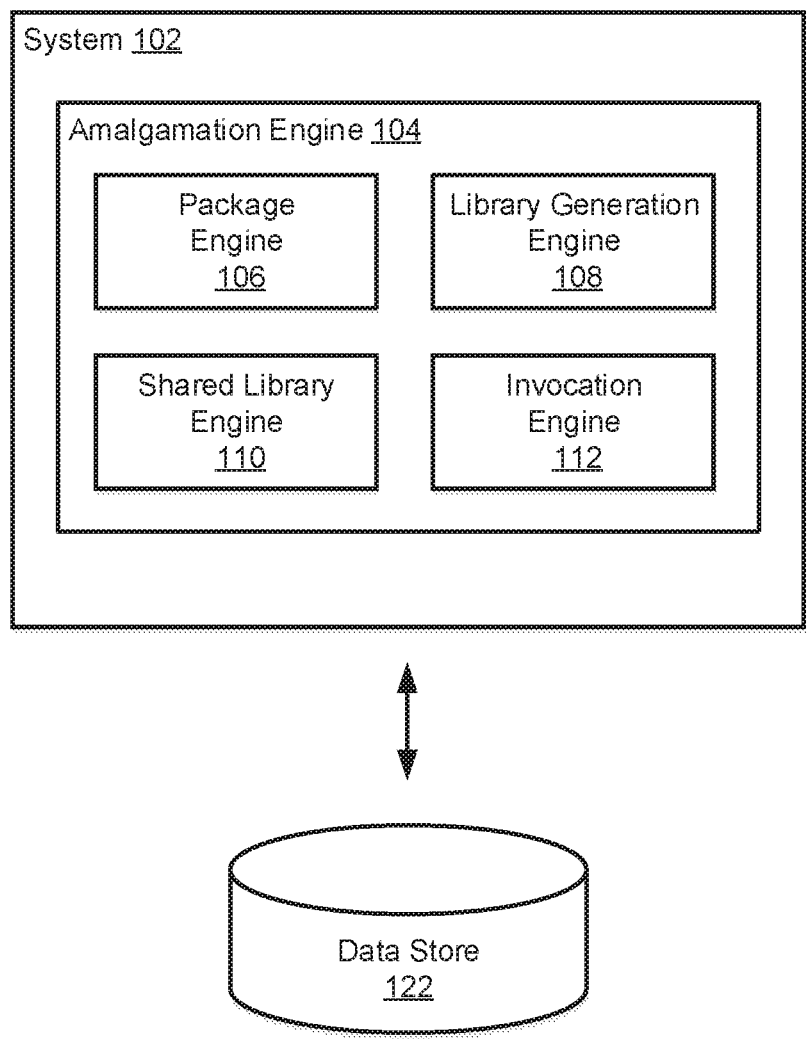
FIG. 1 illustrates an example environment for generating composite programs, in accordance with various embodiments.

Under conventional approaches, software developers may rely on various software packages (e.g., development tools) that can be individually compiled and executed. In one example, a developer using the Go programming language may utilize the errcheck and deadcode packages to identify errors in a software program being developed on a computing system. In this example, the developer can separately install these packages on the computing system. For example, the developer can run the "go get" command along with a location (e.g., directory, uniform resource locator, etc.) from which the package being installed is available. Once installed, these packages can individually be executed to perform various operations with respect to the software program being developed.

This separate installation of packages may not be ideal for various reasons. Thus, in some instances, the developer may want to have the ability to call these packages directly from the software program being developed. One conventional approach to enabling such functionality is to embed the packages as binaries (or resources) into the source code of the software program being developed. The binaries for these packages would then be included in the compiled software program's source code. When the software program is executed and a package's functionality is needed, the software program typically must be able to write the package's binary to a directory in a data store and also have the proper permission to execute the binary file from the directory. Depending on the computing environment, such permissions may not always be available. Further, having separate binaries for each package can require additional storage space which may not be ideal. Another conventional approach involves embedding the source code of a package into the software program being developed. In this approach, when the software program is executed and the package's functionality is needed, the embedded source code is written to a directory, the source code is compiled into an executable, and the package is then run using the executable. Again, this approach requires the software program to have permissions (e.g., read, write, execute permissions) that may not necessarily be available.

A claimed solution rooted in computer technology overcomes problems specifically arising in the realm of computer technology. In various embodiments, a computing system can generate a composite (or amalgamated) software program that incorporates the various functionality provided by individual packages (e.g., errcheck, deadcode, etc.). The composite software program can provide the ability to invoke the various packages without having the drawbacks that typically arise in conventional approaches. In some embodiments, when incorporating a package into the composite software program, an amalgamation software application can be configured to automatically rewrite the source code of the package, including any dependencies, as a callable library (e.g., rewriting the main function of the package as a library). The amalgamation software application can also generate an invocation mechanism for calling the library. This invocation mechanism can be embedded into the composite software program and can be used to invoke the incorporated package when needed. When a user instructs the composite software program to run the package (e.g., using a command-line invocation signal (e.g., "./composite-program_errcheck"), the composite software program can call the invocation mechanism for the package (e.g., errcheck), which calls the respective library for the package. In various embodiments, the invocation mechanism causes the composite software program to run and perform the functionality of the package within a separate process. The package can run in this separate process using an execution stack that has been configured so that, from the package's perspective, the package is running as a standalone executable. As such, the package can run and exit in this separate process without adversely affecting the execution of the composite software program. Although the examples in this specification reference the Go programming language, the approaches described herein can readily be adapted to generate composite software programs written in any compiled programming language.

FIG. 1 illustrates an example environment 100 for generating composite software programs, in accordance with various embodiments. The example environment 100 can include at least one computing system 102 that includes one or more processors and memory. The processors can be configured to perform various operations by interpreting machine-readable instructions. As shown in FIG. 1, in some embodiments, the computing system 102 can include an amalgamation engine 104 that includes a package engine 106, a library generation engine 108, a shared library engine 110, and an invocation engine 112. The amalgamation engine 104 can be executed by the processor(s) of the computing system 102 to perform various operations including those described in reference to the package engine 106, the library generation engine 108, the shared library engine 110, and the invocation engine 112. The environment 100 may also include a data store 122 that is accessible to the computing system 102. In some embodiments, the data store 122 may include various software packages (e.g., Go packages) that are available for installation and execution. In various embodiments, the amalgamation engine 104 can be configured to generate composite software programs. In some embodiments, a composite software program is a software program that is capable of invoking the functionality of various software packages that are otherwise individually executable in addition to performing the various operations that the software program has been configured to perform. In some embodiments, a package is any software package (or program) having its own accessible set of source code.

In various embodiments, the package engine 106 can be configured to obtain various packages to be amalgamated (or re-packaged) into a software program for purposes of generating a composite software program. Once a package has been amalgamated, the composite software program can be instructed to invoke the functionality of the amalgamated package (e.g., sub-package) without having to separately call or generate a corresponding executable for the package. As mentioned, such packages may reside on the data store 122. In some instances, these packages may be obtained over a network, e.g., the Internet, from various software repositories. For example, the software program may rely on the functionality of a first package (e.g., errcheck) and a second package (e.g., deadcode). In this example, the package engine 106 can be configured (or instructed) to obtain the first package and the second package. Each package and its corresponding source code (and dependencies, e.g., libraries) can be stored in a respective directory (e.g., on the data store 122) within the directory corresponding to the software program for which the packages are being amalgamated. In general, each package will have its own directory structure as identified by a respective import path. This directory structure can include various files (e.g., source code files) such as a respective main package that includes a corresponding main function for the package. This main function of a package is typically called when the package is executed individually as a standalone program.

In some embodiments, the library generation engine 108 is configured to programmatically rewrite a main package corresponding to a package being amalgamated into a corresponding library package. In such embodiments, the library generation engine 108 can automatically rewrite the main function of the package to be exported and also be callable publically (e.g., as a non-main function). For example, the "main" function of the package can be rewritten to be callable as "AmalgamatedMain". As a result, the respective source code for each package being amalgamated for a composite software program will be rewritten as a separate callable library package.

In some instances, the software program for which packages are being amalgamated may import instances of packages that are known to utilize global state variables. One example package that uses global variables is the Go "flag" package. In general, a first package can utilize and/or modify a set of global state variables that are provided by an imported package (e.g., the flag package) to function properly. A second package that imports the same package will rely on the same global state variables to function properly. In some instances, both the first and second packages can be amalgamated for use by a composite software program. However, in this example, the composite software program runs the risk of crashing, or producing other errors, when invoking the functionality of the first package and the second package since both the first package and the second package rely on the same set of global variables. To address this risk, in various embodiments, the shared library engine 110 can identify imported packages that utilize shared global state variables. Once identified, the shared library engine 110 can create a respective copy of the imported package that utilizes shared global state variables for each package that imports the package. For example, if both the first package and the second package import the Go "flag" package (which utilizes global variables), then a separate copy of the flag package can be created for the first package and another separate copy of the flag package can be created for the second package. The shared library engine 110 can also modify the rewritten code for packages (e.g., the first and second packages) being amalgamated so that the packages utilize their own copy of the imported package. For example, the shared library engine 110 can rewrite the code for the first package to utilize a first copy of the flag package. Similarly, the shared library engine 110 can rewrite the code for the second package to utilize a second copy of the flag package.

In some embodiments, the library generation engine 108 also creates a new library file that provides an entry point for calling any of the amalgamated packages and/or sub-composite software programs. In such embodiments, only this library file is exported for use by the composite software program. The composite software program can use the library file to call any of the amalgamated packages. As a result, the library file shields the state of the amalgamated packages from other packages.

In various embodiments, the invocation engine 112 is configured to generate respective invocation mechanisms for the amalgamated packages. For example, invoking an amalgamated package through a composite software program without an invocation mechanism will typically cause the amalgamated package to run in-process. In this example, the invoked amalgamated package may perform operations that adversely affect the operation of the composite software program. In one example, the amalgamated package may call an exit function (e.g., "os.Exit") which causes the composite software program to exit. In another example, the amalgamated package may modify global variables (e.g., "os.Args") which may cause the composite software program to crash. Thus, in various embodiments, the invocation engine 112 is configured to generate respective invocation mechanisms for the amalgamated packages that allow the amalgamated packages to be invoked safely without adversely affecting the operation of the composite software program.

In some embodiments, the invocation engine 112 configures the composite software program to be provided with a special invocation signal when executed. In such embodiments, this special invocation signal can be used to instruct the composite software program to immediately re-invoke itself in a manner that executes the logic of an amalgamated package. In some embodiments, when invoking an amalgamated package as described, the composite software program runs the amalgamated package in a separate process using an execution stack that has been configured so that, from the amalgamated package's perspective, the amalgamated package is running as a standalone executable.

For example, in some embodiments, a composite software program having an executable named "essayChecker" can be invoked from the command-line (e.g., "./essayChecker"). Further, any parameters, or arguments, to be passed to the composite software program can also be provided through the command-line (e.g., "./essayChecker myEssay.txt"). In this example, the composite software program may be configured to invoke an amalgamated spell checking package, e.g., "spellCheck", as follows "./essayChecker_spellCheck". Here, the invocation signal "_" (two underscores) is followed by the name of the amalgamated package "spellCheck" to be invoked. Similarly, additional parameters, or arguments, can be provided to the amalgamated package through the command-line, e.g., "./essayChecker_spellCheck-british-english=true myEssay.txt". In this example, the arguments "—british-engline=true" and "myEssay.txt" can be utilized by the amalgamated package when performing various operations. In some embodiments, the composite software program (e.g., "essayChecker") splices out the invocation signal (e.g., "_spellCheck") so that the command-line arguments match the command-line arguments that would normally be expected by the amalgamated package being invoked (e.g., "./essayChecker-british-english=true myEssay.txt"). These modified command-line arguments can be provided to the library function (e.g., the rewritten main function) that was generated for the amalgamated package, as described above. The library function performs the functionality of the amalgamated package (e.g., "spellCheck") by running in a separate sub-process. As a result, any operations performed by the library function (e.g., "os.Exit") will only impact the sub-process. Once invocation of the amalgamated package (e.g., library function of the amalgamated package) is complete, the composite software program can process the output from the amalgamated package and proceed accordingly.

As described, the amalgamation engine 104 produces a set of source code files that are automatically (or programmatically) generated. In some embodiments, these source code files correspond to a software program and various amalgamated packages. In such embodiments, these source code files can be compiled into a single executable, e.g., a composite software program, that can invoke the functionality of the various packages without requiring separate, standalone executables for each of those packages. In general, the overall size of the composite software program will typically be much more compact in comparison to having standalone executables for the packages.

In various embodiments, the amalgamation engine 104 is capable of generating composite software programs that support multiple levels of composition using the approaches described above. For example, a first composite software program (e.g., "dictionary") may be capable of invoking a first amalgamated package (e.g., "medical-dict") and a second amalgamated package (e.g., "law-reference"). Here, the first composite software program can be run as a standalone program (e.g., "./dictionary") and/or be used to invoke an amalgamated package (e.g., "./dictionary_medical-dict look-up arthritis". Similarly, a second composite software program (e.g., "thesaurus") may be capable of invoking a third amalgamated package (e.g., "med-thesaurus") and a fourth amalgamated package (e.g., "law-reference"). In this example, a third composite software program (e.g., "omni-reference") can be generated to support invocation of the first composite software program (e.g., "dictionary") and the second composite software program (e.g., "thesaurus"). In various embodiments, embedded composite software programs (e.g., "dictionary" or "thesaurus") can be called using a runner. In such embodiments, the runner can namespace based on the amalgamated packages (i.e., generated libraries). As a result, an embedded composite software program can be invoked using a separate invocation signal. For example, the composite software program "omni-reference" can invoke the sub-composite software program "dictionary" as follows: "./omni-reference_dictionary _law-reference look-up negligence". In this example, the sub-composite software program "dictionary" is invoked using the signal "_dictionary" and the amalgamated package "law-reference" is invoked using a separate signal "_law-reference".

Figure 2A:
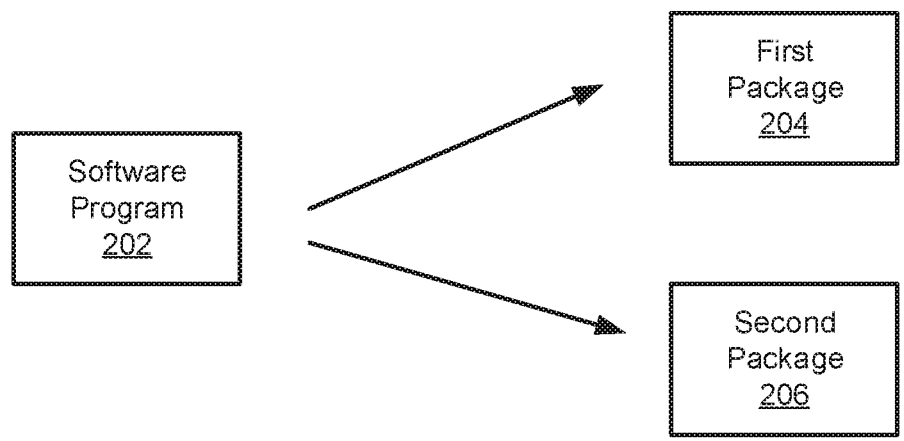
FIGS. 2A-B illustrate example diagrams of generating a composite software program, in accordance with various embodiments.
Figure 2B:
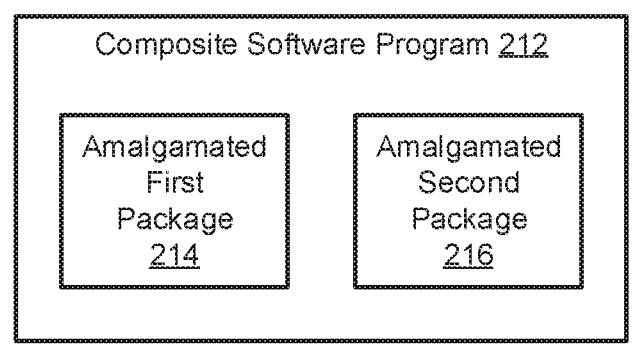

FIGS. 2A-B illustrate example diagrams of generating a composite software program, in accordance with various embodiments. For example, FIG. 2A illustrates an example standalone software program 202 (e.g., "myProgram") that relies on a standalone first package 204 (e.g., "errcheck") and a standalone second package 206 (e.g., "deadcode") for performing various operations. In this example, the software program 202 can individually install (e.g., download, compile, etc.) the first package 204 and the second package 206. Once installed, the first package 204 and/or the second package 206 will have corresponding executable files that can individually be executed by the software program 202 to perform various operations. As mentioned, such an approach may not be ideal for various reasons. Thus, in various embodiments, a composite software program can be generated to incorporate the functionality of the software program 202 along with the functionalities of the first package 204 and the second package 206. For example, FIG. 2B illustrates a standalone composite software program 212 that includes the functionality of the software program 202 as well as both the first package 204 and the second package 206. In this example, the first package 204 has been amalgamated using the approaches described above to be included in the composite software program 212 as the amalgamated first package 214. Similarly, the second package 206 has been amalgamated to be included in the composite software program 212 as the amalgamated second package 216. In various embodiments, the respective invocation mechanism of the amalgamated first package 214 can be used to invoke operations that would typically be performed by a standalone executable corresponding to the first package 204. Similarly, the respective invocation mechanism of the amalgamated second package 216 can be used to invoke operations that would typically be performed by a standalone executable corresponding to the second package 206.

Figure 3:
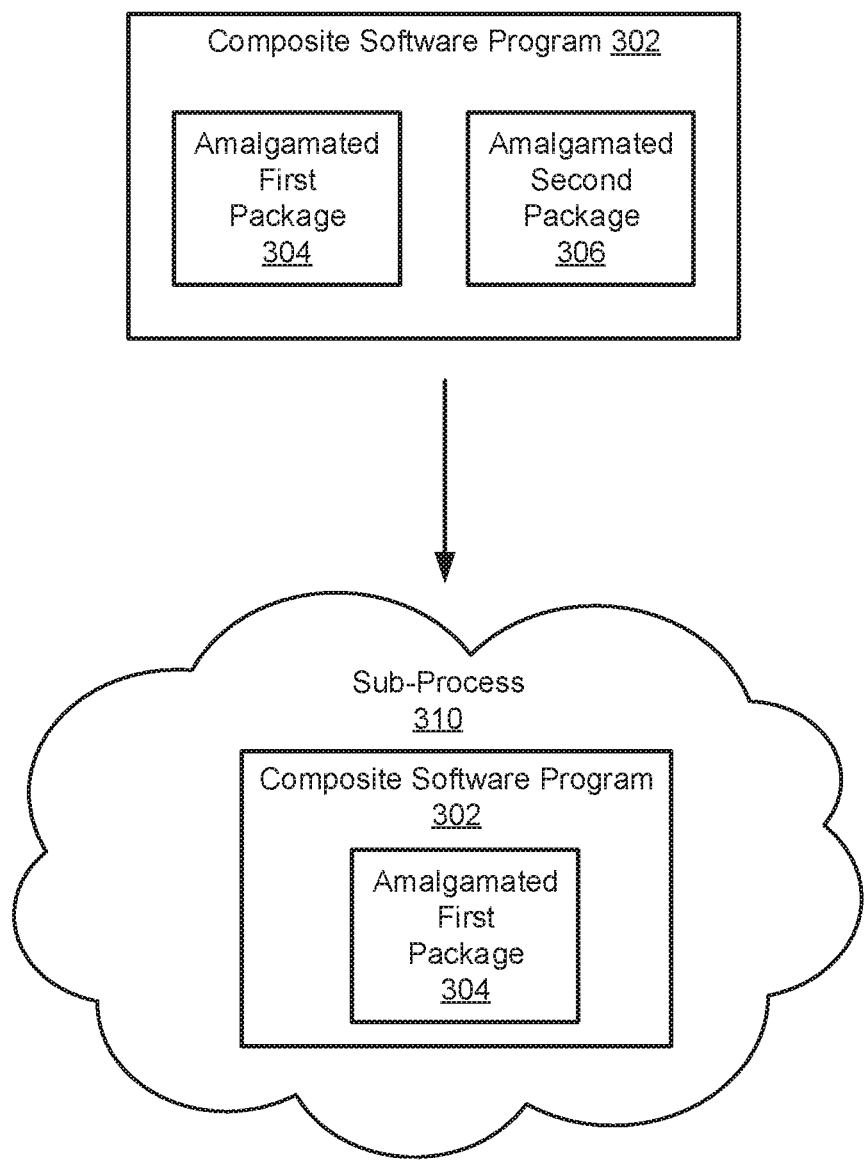
FIG. 3 illustrates an example diagram of invoking an amalgamated package, in accordance with various embodiments.

FIG. 3 illustrates an example diagram of invoking an amalgamated package, in accordance with various embodiments. As shown, the example of FIG. 3 includes a composite software program 302 that includes the functionality of a software program as well as both an amalgamated first package 304 and an amalgamated second package 306. In various embodiments, the composite software package 302 is configured to recognize and process any invocation signals that are provided from the command-line. For example, the composite software package 302 can be instructed to invoke the amalgamated first package 304 by running the composite software package 302 with an invocation signal that references the amalgamated first package 304. In the example of FIG. 3, the composite software package 302 processes the invocation signal to determine that the amalgamated first package 304 is being invoked. Based on the invocation signal, the composite software program 302 can then run within a sub-process 310 in a manner such that the behavior of the composite software program 302 is identical to invoking the amalgamated first package 304 as a standalone executable.

Figure 4:
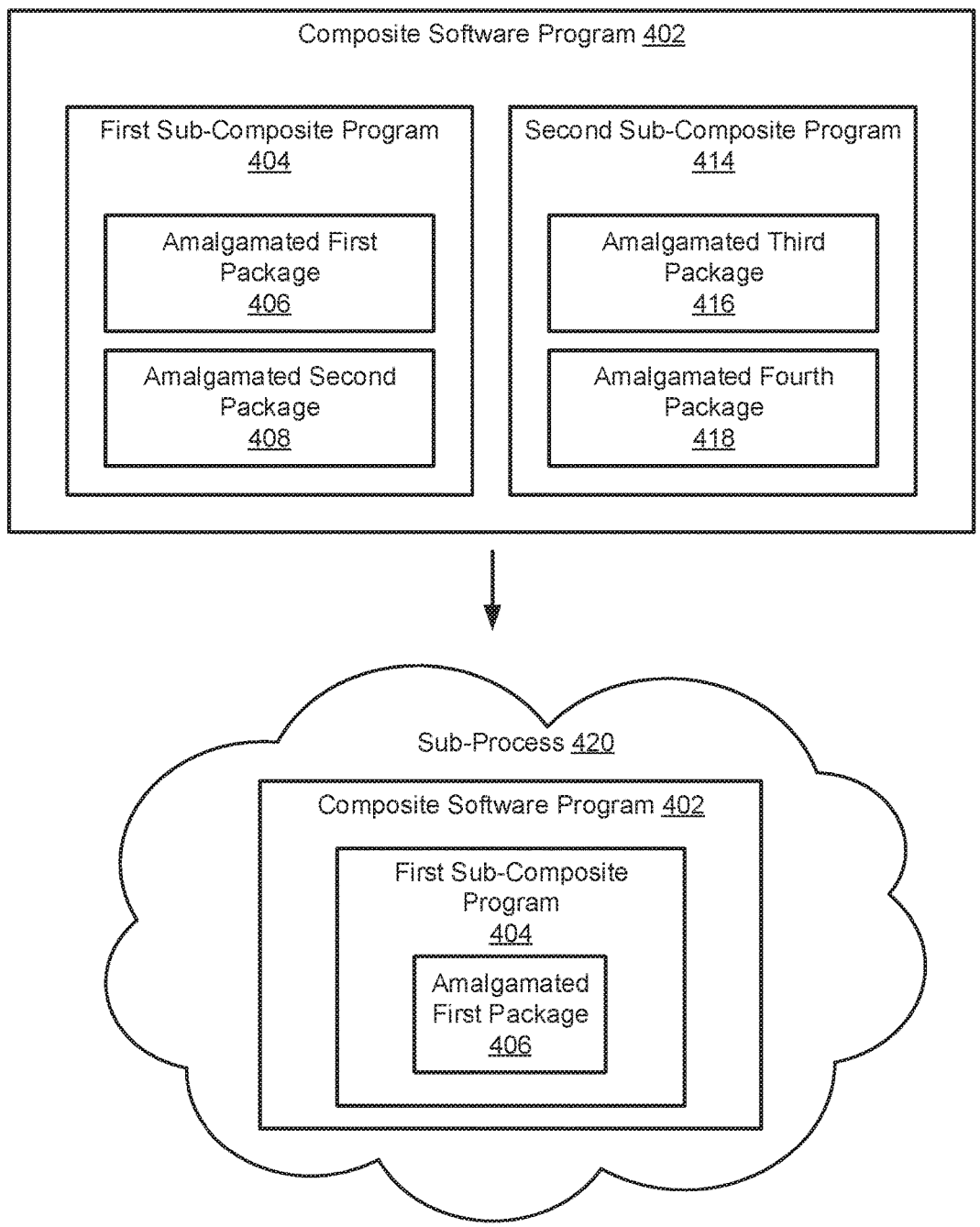
FIG. 4 illustrates an example diagram of generating a composite software program with multiple-levels of composition, in accordance with various embodiments.

FIG. 4 illustrates an example diagram of generating a composite software program with multiple-levels of composition, in accordance with various embodiments. As shown, the example of FIG. 4 includes a composite software program 402 that includes the functionality of a first sub-composite software program 404 and a second sub-composite software program 414. The first sub-composite software program 404 includes an amalgamated first package 406 and an amalgamated second package 408. Similarly, the second sub-composite software program 414 includes an amalgamated third package 416 and an amalgamated fourth package 418. As mentioned, in various embodiments, the composite software package 402 is configured to recognize and process any invocation signals that are provided from the command-line for purposes of invoking a sub-composite software program and/or any amalgamated packages within sub-composite software programs.

For example, the composite software program 402 can be invoked to specify the execution of the amalgamated first package 406 (e.g., using an invocation signal that references the first sub-composite program 404 and the amalgamated first package 406). When the composite software program 402 is invoked in a separate sub-process, the composite software package 402 passes control to the invocation engine of the first sub-composite software program 404, which then invokes the functionality of the amalgamated first package 406. Such chaining of invocation mechanisms (or engines) allows this multi-level embedding. As shown, the invocation of the amalgamated first package 406 can involve the composite software program 402 invoking itself in a separate sub-process 420 so that the first sub-composite program 404 is invoked to execute the amalgamated first package 406. This same process can be extended arbitrarily, and the design of the invocation engine can ensure that only a single sub-process is required regardless of the number of compositions.

Figure 5:
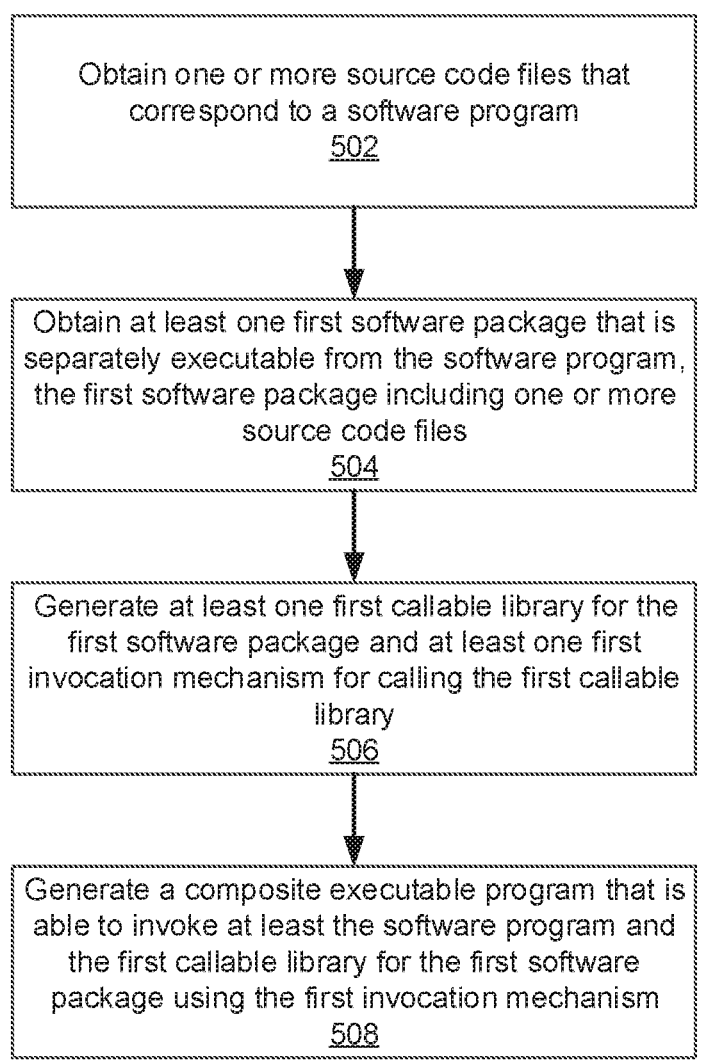
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, one or more source code files that correspond to a software program are obtained. At block 504, at least one first software package that is separately executable from the software program is obtained. The first software package can include one or more source code files. At block 506, at least one first callable library for the first software package and at least one first invocation mechanism for calling the first callable library are generated. At block 508, a composite software program that is capable of invoking at least the software program and the first callable library for the first software package using the first invocation mechanism is generated.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
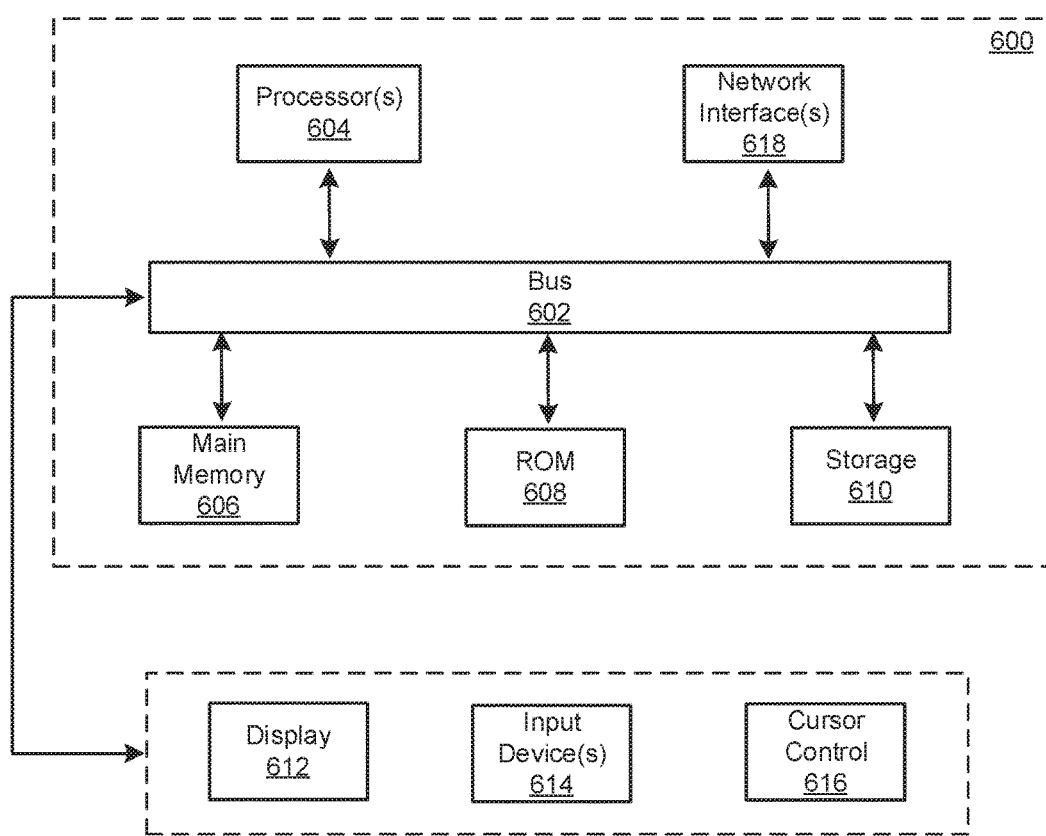
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method being implemented by a computing system including one or more physical processors and storage media storing machine-readable instructions, the method comprising:

obtaining, by the computing system, one or more first source code files that correspond to a software program;

obtaining, by the computing system, at least one first software package that is separately executable from the software program, the first software package including one or more second source code files, the one or more second source code files including at least one first function that is not public-callable;

generating, by the computing system in response to the at least one first software package being obtained, at least one first callable library for the first software package and at least one first invocation mechanism for calling the first callable library, the at least one first callable library being generated at least in part by the computing system automatically rewriting, without requiring user input, the one or more second source code files to be the first callable library, the rewriting including rewriting the at least one first function to become public-callable; and generating, by the computing system, a composite software program that is capable of invoking at least the software program and the first callable library for the first software package using the first invocation mechanism, the first invocation mechanism being embedded in the composite software program.

2. The method of claim 1, the method further comprising: causing the composite software program to invoke the first callable library for the first software package.

3. The method of claim 2, wherein causing the composite software program to invoke the first callable library further comprises:

executing the composite software program using a command-line argument that references the first invocation mechanism for the first software package.

4. The method of claim 2, wherein the first callable library is executed in a separate sub-process with a separate execution stack.

5. The method of claim 1, the method further comprising:

obtaining at least one second software package that is separately executable from the software program, the second software package including one or more third source code files;

generating at least one second callable library for the second software package and at least one second invocation mechanism for calling the second callable library; and generating a new composite software program that is capable of invoking at least the software program, the first callable library for the first software package using the first invocation mechanism, and the second callable library for the second software package using the second invocation mechanism.

6. The method of claim 5, wherein the new composite software program is capable of invoking functionalities of the software program, the first software package, and the second software package.

7. The method of claim 5, wherein generating the new composite software program that is capable of invoking at least the software program further comprises:

determining that the first software package and the second software package both import a package that utilizes shared global variables;

creating a first copy of the package for the first software package;

modifying the one or more second source code files for the first software package to use the first copy of the package;

creating a second copy of the package for the second software package; and modifying the one or more third source code files for the second software package to use the second copy of the package.

8. The method of claim 1, wherein generating the first callable library for the first software package and the first invocation mechanism for calling the first callable library further comprises:

automatically rewriting the one or more second source code files corresponding to the first software package to be the first callable library.

9. The method of claim 8, wherein at least a particular source code file of the one or more second source code files that includes a main function for the first software package is rewritten to be callable as a separate non-main library function.

10. A system comprising:
one or more processors; and
memory storing instructions that, when executed by the one or more processors, cause the system to perform:

obtaining, by the computing system, one or more first source code files that correspond to a software program;

obtaining, by the computing system, at least one first software package that is separately executable from the software program, the first software package including one or more second source code files, the one or more second source code files including at least one first function that is not public-callable;

generating, by the computing system in response to the at least one first software package being obtained, at least one first callable library for the first software package and at least one first invocation mechanism for calling the first callable library, the at least one first callable library being generated at least in part by the computing system automatically rewriting, without requiring user input, the one or more second source code files to be the first callable library, the rewriting including rewriting the at least one first function to become public-callable; and generating, by the computing system, a composite software program that is capable of invoking at least the software program and the first callable library for the first software package using the first invocation mechanism, the first invocation mechanism being embedded in the composite software program.

11. The system of claim 10, wherein the instructions further cause the system to perform:

causing the composite software program to invoke the first callable library for the first software package.

12. The system of claim 11, wherein causing the composite software program to invoke the first callable library further cause the system to perform:

executing the composite software program using a command-line argument that references the first invocation mechanism for the first software package.

13. The system of claim 11, wherein the first callable library is executed in a separate sub-process with a separate execution stack.

14. The system of claim 10, wherein the instructions further cause the system to perform:

obtaining at least one second software package that is separately executable from the software program, the second software package including one or more third source code files;

generating at least one second callable library for the second software package and at least one second invocation mechanism for calling the second callable library; and generating a new composite software program that is capable of invoking at least the software program, the first callable library for the first software package using the first invocation mechanism, and the second callable library for the second software package using the second invocation mechanism.

15. A non-transitory computer readable medium comprising instructions that, when executed, cause one or more processors to perform:

obtaining, by the computing system, one or more first source code files that correspond to a software program;

obtaining, by the computing system, at least one first software package that is separately executable from the software program, the first software package including one or more second source code files, the one or more second source code files including at least one first function that is not public-callable;

generating, by the computing system in response to the at least one first software package being obtained, at least one first callable library for the first software package and at least one first invocation mechanism for calling the first callable library, the at least one first callable library being generated at least in part by the computing system automatically rewriting, without requiring user input, the one or more second source code files to be the first callable library, the rewriting including rewriting the at least one first function to become public-callable; and generating, by the computing system, a composite software program that is capable of invoking at least the software program and the first callable library for the first software package using the first invocation mechanism, the first invocation mechanism being embedded in the composite software program.

16. The non-transitory computer readable medium of claim 15, wherein the instructions further cause the processors to perform:

causing the composite software program to invoke the first callable library for the first software package.

17. The non-transitory computer readable medium of claim 16, wherein causing the composite software program to invoke the first callable library further cause the processors to perform:

executing the composite software program using a command-line argument that references the first invocation mechanism for the first software package.

18. The non-transitory computer readable medium of claim 16, wherein the first callable library is executed in a separate sub-process with a separate execution stack.

19. The non-transitory computer readable medium of claim 15, wherein the instructions further cause the system to perform:

obtaining at least one second software package that is separately executable from the software program, the second software package including one or more third source code files;

generating at least one second callable library for the second software package and at least one second invocation mechanism for calling the second callable library; and generating a new composite software program that is capable of invoking at least the software program, the first callable library for the first software package using the first invocation mechanism, and the second callable library for the second software package using the second invocation mechanism.

* * * * *